United States Patent [19]

Tomlinson, III et al.

[11] 4,208,094

[45] Jun. 17, 1980

[54] OPTICAL SWITCH

[75] Inventors: Walter J. Tomlinson, III, Holmdel; Richard E. Wagner, Fair Haven, both of N.J.

[73] Assignee: Bell Telephone Laboratories, Incorporated, Murray Hill, N.J.

[21] Appl. No.: 947,651

[22] Filed: Oct. 2, 1978

[51] Int. Cl.$^2$ .............................................. G02B 5/14
[52] U.S. Cl. ........................... 350/96.20; 350/96.16; 350/96.18; 350/96.19
[58] Field of Search ................ 350/96.15, 96.16, 96.18, 350/96.19, 96.20, 162 R

[56] References Cited

U.S. PATENT DOCUMENTS

| 3,874,781 | 4/1975 | Thiel | 350/96.16 |
|---|---|---|---|
| 3,883,223 | 5/1975 | Hudson | 350/96.16 |
| 3,937,557 | 2/1976 | Milton | 350/96.16 |
| 4,013,342 | 3/1977 | Narodny | 350/96.20 |
| 4,111,524 | 9/1978 | Tomlinson | 350/96.19 |
| 4,153,330 | 5/1979 | Tomlinson | 350/96.18 |

OTHER PUBLICATIONS

Ishikawa et al., 1977 *Gen'l Nat'l Meeting of The Inst. of Japan Electronic Comm. Eng.*, pp. 4–220(916).
Usui et al., "Three-Way Optical Directional Coupler", *IECE Meeting*, Mar. 1978, paper 852, pp. 1–6.
Mito et al., "Electrically Driven Rotating Mirror Type Multichannel Optical Switch", 1978 *Electronic Comm. Soc. Nat'l Conf.*, paper 860, Mar. 1978, pp. 1–4.
Suganuma et al., "Triangularly Arranged Multicore Optical Fiber Connector", Electronic Comm. Soc., Japan 1978, Nat'l. Conf., paper 886, pp. 1–4.

*Primary Examiner*—Stewart J. Levy
*Attorney, Agent, or Firm*—Daniel D. Dubosky

[57] ABSTRACT

A rugged, compact optical switch is disclosed which comprises a quarter-period graded refractive index (GRIN) lens (1); a rotatable reflecting surface (2.1) disposed at a first surface (1.3) of the GRIN lens at an angle to the first surface; an optical source (8) mounted at the second surface (1.2) of the GRIN lens on the lens axis; and a plurality of optical receptors 6, 7, 9, 10, 11 and 12 mounted at the same second surface of the lens, all at the same distance from the lens axis but displaced at a plurality of angular positions about the lens axis. Rotation of the reflecting surface about the lens axis couples light between the optical source selectively to optical receptors at the appropriate angular orientation. The switch is reciprocal in that the common optical source may be an optical receptor and the various optical receptors, optical sources. Typically, the optical sources and receptors are optical fibers.

16 Claims, 7 Drawing Figures 4,208,094

OPTICAL SWITCH

BACKGROUND OF THE INVENTION

The invention relates to optical switches and more particularly to a rugged, compact optical switch which may be used for optical fibers.

The development of optical communication systems requires various devices for interconnecting, coupling and switching signals between optical sources and receptors such as optical fibers. Such switches could be used, for example, for switching various attenuators or delays into a line or for connecting sources having different optical wavelengths to a line in order to test a wavelength multiplexer or for many other applications.

Such optical switches should provide for low loss in each position, high isolation between outputs, a relatively fast switching time and a reasonably low cost. However, a problem with the coupling of light directly between optical fibers is that it must be done with great precision, which generally requires machining of parts to high mechanical tolerances.

SUMMARY OF THE INVENTION

An optical switch constructed according to the invention comprises an optical focusing lens element having a lens axis, a rotatable reflecting surface disposed at a first surface of the optical focusing lens element such that an angle is formed between a normal to the rotatable reflecting surface and the lens axis, and means for supporting the rotatable reflecting surface in such a manner that the rotatable reflecting surface is rotatable about the lens axis while maintaining the angle fixed at a substantially constant value. An optical source is mounted at the second surface of the optical focusing lens element substantially at the lens axis, and a plurality of optical receptors are mounted at the same second surface of the optical focusing lens element, all at substantially the same radial distance from the lens axis, but displaced at different angular positions about the lens axis. By rotating the rotatable reflecting surface, light may be coupled between the optical source and any of the optical receptors selectively. The optical switch is reciprocal in that the common optical source may be replaced by a common optical receptor and the various optical receptors may be replaced by various optical sources. For most applications of the invention the preferred embodiment of the optical focusing lens element is a quarter-period graded refractive index lens.

BRIEF DESCRIPTION OF THE DRAWINGS

A complete understanding of the present invention and of the above and other objects thereof may be gained from a consideration of the following detailed description presented hereinbelow in connection with the accompanying drawings in which.

DETAILED DESCRIPTION

Figure 1:
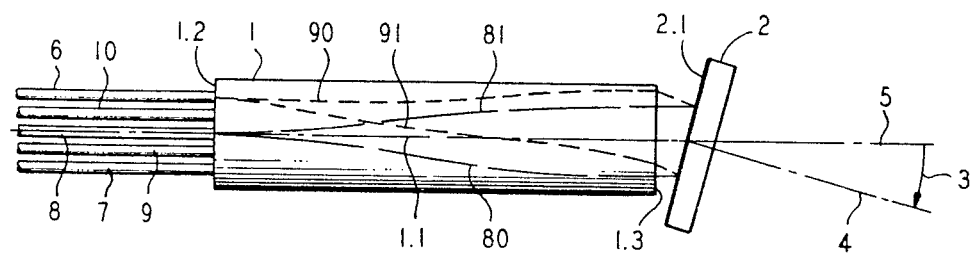
FIG. 1 shows in partially pictorial, partially schematic form an optical switch in the side view.

FIG. 1 shows an illustrative embodiment of the present invention from which the principle of operation of the optical switch may be understood. Optical source 8 is mounted on surface 1.2 of lens element 1, at the intersection of lens axis 1.1 with surface 1.2. Optical source 8 is shown illustratively to be a conventional optical fiber having a cylindrical core surrounded by a cladding. However, the source may just as well be chosen from such devices as a laser, light-emitting diode or any other optical sources known to those skilled in the art. Radiation from optical source 8 enters optical focusing lens element 1, illustratively taken to be a graded refractive index (GRIN) lens element. For most applications of the invention the preferred embodiment of the optical focusing lens element 1 is a GRIN lens element. However, in situations in which it is necessary to make a switch with a great many positions, the diameter of the array of output receptors could become sufficiently large that the off-axis aberrations in a GRIN lens would result in excessive insertion loss and/or crosstalk. Similarly, in situations in which it is necessary to switch optical signals at widely separated wavelengths, the chromatic aberrations of a GRIN lens could result in excessive insertion loss and/or crosstalk. In such cases one could use a conventional multielement lens, such as a high resolution camera lens. Such lenses are generally much larger and more expensive than GRIN lenses, and would only be used in situations where a GRIN lens was not suitable. An optical beam longitudinally propagating through a GRIN-rod type lens follows substantially a sinusoidal path. As the rays representing the light beam advance through the lens, such rays alternatively converge and diverge at repetitive intervals related to the period of the sinusoidal path. The length of optical focusing lens element 1 is made substantially equal to one-quarter of the period of the sinusoidal path of the beam passing therethrough. As a result, radiation introduced at surface 1.2 of lens element 1 from a point, such as light from optical source 8, exits surface 1.3 of lens element 1 as collimated radiation. Conversely, collimated radiation entering surface 1.3 of lens element 1, such as collimated light reflected from reflecting surface 2.1 of a reflector 2, exits surface 1.2 of lens element 1 by being focused to a point. GRIN lens element 1 is an advantageous focusing device because it provides a high numerical aperature for efficient light coupling into and out of optical sources and receptors, such as optical fibers, while at the same time providing low aberrations.

Radiation, shown by lines 80 and 81 in FIG. 1, entering surface 1.2 of lens element 1 from optical source 8 is collimated and impinges upon reflecting surface 2.1 of reflector 2. Optical source 8 is mounted at substantially the optical axis 1.1 of lens element 1 which is also the axis of rotation 5 of reflector 2.

Figure 2:
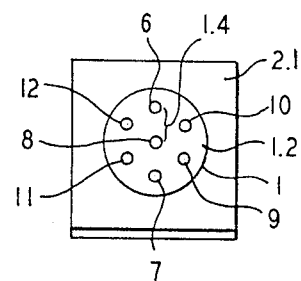
FIG. 2 shows in partially pictorial, partially schematic form an optical switch in an end view.

Reflector 2 is mounted adjacent to surface 1.3 of lens element 1 in such a manner that an angle 3 is formed between the axis of rotation 5 and a normal 4 to reflecting surface of 2.1 of reflector 2. The collimated radiation leaving surface 1.3 of lens element 1 is reflected from reflecting surface 2.1 and reenters lens element 1 through surface 1.3. The radiation, shown by lines 90 and 91 in FIG. 1, then passes through lens element 1 and emerges from surface 1.2 focused to a point off the optic axis which is displaced from optical source 8 by a distance 1.4 as is shown in FIG. 2. Distance 1.4 is determined, as is well known to those skilled in the art, to be approximately equal to the product of the magnitude of angle 3 in FIG. 1 and twice the effective focal length of lens element 1. By rotating reflector 2 about axis of rotation 5, taken also to be the optic axis of lens element 1 for the best mode as discussed hereinbelow, the output image of optical source 8 appearing on lens surface 1.2, can be scanned around a circle of radius equal to distance 1.4. As shown in FIG. 2, optical receptors 6, 7, 9, 10, 11 and 12 are mounted at surface 1.2 of lens element 1 at a plurality of angles about the circle scanned by the image of optical source 8. Thus, the output image can be coupled to any of the optical receptors by rotating reflector 2 to the appropriate orientation. If desired, reflector 2 could be arranged to rotate continuously.

It should be noted that it is not absolutely necessary for axis of rotation 5 to be identical to lens axis 1.1 for the invention to act as described. The reflector may rotate about any axis parallel to the lens axis and maintain the outputs centered about the lens axis. Also, if the axis of rotation is not quite parallel to the lens axis, the device will still give a circular output, but not centered on the lens axis. However, the best mode of operation is obtained when optical source 8 is mounted at substantially the optical axis 1.1 of lens element 1, and axis of rotation 5 is substantially parallel to the lens axis 1.1.

It should also be noted that the device is reciprocal in that optical source 8 may be a common optical receptor and optical receptors 6, 7, 9, 10, 11 and 12 may be various optical sources such as optical fibers. To eliminate reflection losses at surface 1.3 of lens element 1, an antireflection coating may be applied to the surface, or the space between surface 1.3 of lens element 1 and surface 2.1 of reflector 2 could be filled with an index matching fluid of the types that are commercially available. Reflecting surface 2.1 of reflector 2 should be provided with a coating having a high reflectivity for light in the range of wavelengths to be switched. It is also noted that in the apparatus constructed according to the present invention the output signal at the optical receptors is a 1.1 image of the optical source. The apparatus is thus insensitive to the mode configuration of the light energy passing therethrough and thereby provides substantially equal coupling for all optical modes.

Figure 3:
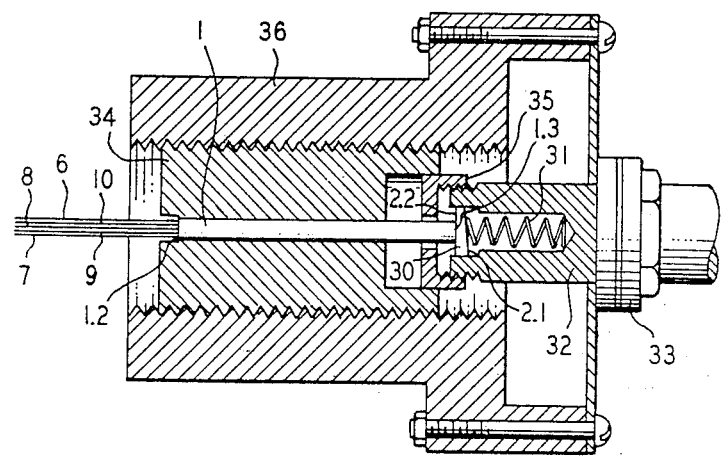
FIG. 3 shows a cross-sectional diagram in partially pictorial, partially schematic form of an embodiment of the present invention using a wedge with a highly reflecting coating as the reflective element of the optical switch.

The reflecting surface 2.1 may be fabricated on the end of a rod if it is desired to aid in mechanically rotating the surface to accomplish the switching function. Alternatively, the reflecting surface may be placed on a wedge that would fit against surface 1.3 of lens element 1. In this configuration, it would be appropriate to insert an index matching fluid between surface 1.3 and the wedge to eliminate reflection loss and to serve as a lubricant. An embodiment of the invention shown in FIG. 3 uses a configuration wherein reflecting surface 2.1 is placed on the surface of wedge 30. Surface 2.2 of wedge 30 is butted up against surface 1.3 of lens element 1. Spring 31 operates to keep surface 2.2 of wedge 30 butted against surface 1.3 of GRIN lens 1. Wedge 30 is placed in a slot in wedge holder 32. This embodiment is advantageous in one aspect because angle 3 shown in FIG. 1 between axis of rotation 5 and normal 4 to reflecting surface 2.1 remains constant here in spite of any translation of wedge surface 2.2 against surface 1.3 of lens element 1. This configuration in this aspect makes the switch more easily amenable to construction with commercially available machine tolerances.

Surface 2.1 of wedge 30 is coated with a highly reflective coating such as silver or aluminum. An index matching fluid such as is commercially available is placed between wedge surface 2.2 and surface 1.3 of lens element 1 to reduce reflection and to serve as a lubricant. Wedge 30 may be made from glass.

Wedge retainer 32 is attached to indexing mechanism 33 to provide the rotation of wedge 30 to desired orientations for selective switching of light from optical fiber 8 to optical fibers 6, 7, 9, 10, 11 and 12. The invention has been reduced to practice by using the detent mechanism from a commercially available rotary switch made by the Oak Industries, Inc., Switch Division, Crystal Lake, Ill. 60014 as indexing mechanism 33. GRIN lens element 1 is held by retainer 34 and contacts wedge 30 by protruding through a clearance hole in retainer cap 35. Contact pressure between wedge 30 and GRIN lens element 1 is maintained by spring 31. Cap 35 is threaded, as is the outside of wedge holder 32 to provide the coupling between wedge 30 and GRIN lens element 1. Retainer 34 is threaded on its outside surface so as to couple into the inner surface of body 36 which is also threaded. The operation of the switch has been previously described in the discussion pertaining to FIG. 1 and the operation of an Oak switch mechanism is well known in the art. The use of the Oak switch mechanism and the scaling of distances converts the rigid positional tolerance for alignment of output image positions to angular tolerances such as one-quarter of a degree, which are easily obtainable in commercial machining and stamping methods.

Figure 4:
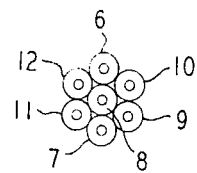
FIG. 4 shows in partially pictorial, partially schematic form a close-packed array of optical fibers.
Figure 5:
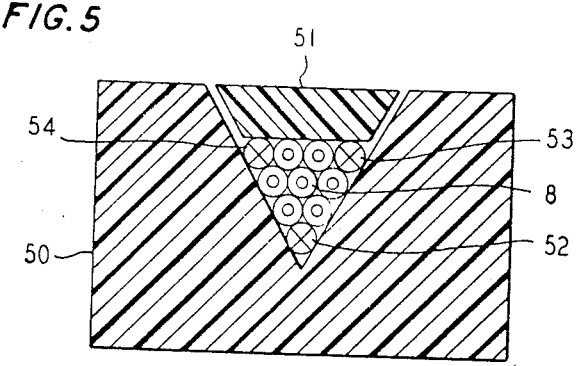
FIG. 5 shows in partially pictorial, partially schematic form an embodiment of an apparatus for producing a close-packed array of optical fibers.
Figure 6:
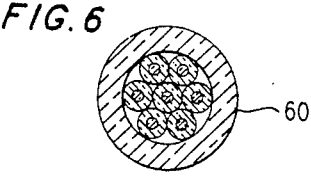
FIG. 6 shows in partially pictorial, partially schematic form an apparatus for producing a circular array of fibers about a central fiber.

For an embodiment of the present invention for use as an optical fiber switch, it is desirable to have circular arrays of optical fibers with an additional fiber in the center of the array. There are various techniques that can be used to prepare such arrays that are well known to those skilled in the art. Perhaps the simplest approach is to use seven identical fibers in a close-packed array as is shown in FIG. 4. This close-packed array may be achieved in the apparatus shown in FIG. 5 which has been reported by R. Sugenuma and Y. Mijake, Paper 886, National Convention of the Institute of Electronics and Communication Engineers of Japan, March, 1978. The desired seven fibers 8, 6, 7, 9, 10, 11 and 12 and three dummy fibers 52, 53 and 54 are placed in 60 degree V-groove 50. Flat piece 51 is used to press the fibers into the groove. A cement such as Buehler type 8133 epoxy (available from Buehler Ltd., 2120 Greenwood St., Evanston, Ill.) is then flowed into the spaces between the fibers and allowed to harden. After the cement is hardened, the entire assembly is cut normal to the fiber axes and then polished flat using standard optical polishing techniques. An alternate approach is to use jig 60 shown in FIG. 6 with a hole just slightly larger than the outside diameter of the array. The fibers are gently inserted into the hole using a manipulator and cemented in place. Jig 60 may be fabricated by drawing down a piece of thick wall capillary tubing using well established glass drawing techniques. For the greatest precision in the fiber positions, it may be advantageous to prepare the jig with a slight taper so that the fibers can be inserted to the point where the hole is just the right size. After the cement is hardened, the assembly can be cut and polished using the same techniques as were described hereinabove for V-groove jig 50 shown in FIG. 5.

For circular arrays of other than six fibers, the circular jig technique may be used. However, for an array of n fibers, each with a diameter d, the center fiber must have an outside diameter given by $$\text{diameter} = d[csc(\pi/n) - 1] \qquad (1)$$

Thus, one would prepare a special fiber with the desired outside diameter. Alternatively, a capillary tube could be drawn down to the correct diameter leaving a hole in the middle into which the central fiber could be inserted and glued into place. For this approach, it is important that the capillary tube have the correct ratio of inside and outside diameters. This is accomplished by grinding the capillary to the proper outside diameter to match its inside diameter before drawing.

Figure 7:
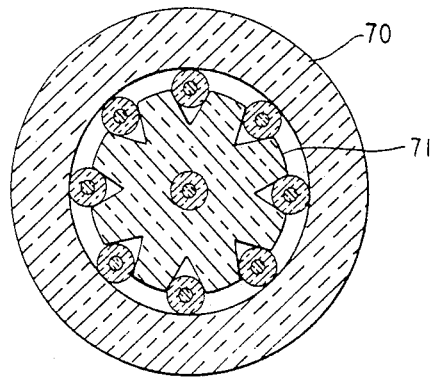
FIG. 7 shows in partially pictorial, partially schematic form an embodiment of an apparatus for producing a circular array of optical fibers about a central fiber, with the circular array of optical fibers displaced at a radial distance from the central fiber which is greater than the diameter of the central fiber.

The circular jig technique has one minor problem. It is possible for the fibers to spiral around the central fiber or spacer. If this were to occur, their axes would not be parallel to each other or to the central fiber. This can be a problem because various applications for circular arrays require that the fibers be more or less parallel, however, deviations from parallelism up to at least 0.1 of the fiber numerical aperature are easily tolerated. The required parallelism can be easily achieved by applying a slight tension to the first fiber inserted so that it is held straight and serves as a guide for the rest of the array. Alternatively, the spacer or the jig may be made with grooves to hold the fibers straight as illustrated in FIG. 7. These grooves could be cut or molded before the spacer or jig is drawn down to the correct size. By using grooves to determine the fiber positions, it is also possible to make arrays with the fibers spaced at a distance from the central fiber, and from each other, which is greater than the fiber diameter, as is shown in FIG. 7.

The arrays discussed above are glued onto surface 1.2 of lens element 1 in FIG. 1 by methods that are well known in the art using a suitable index matching adhesive such as HE-79 optical cement made by the Eastman Kodak Company of Rochester, N.Y. Such a material mechanically secures the fibers in place and at the same time minimizes reflections at the interface between the fibers and the attached segments.

The array may be aligned by illuminating lens surface 1.3 with a beam of radiation which is parallel to the lens axis. The light is brought to a focus at the lens axis on surface 1.2. The array is manipulated on surface 1.2 until the maximum intensity of light is coupled into fiber 8. The array is then glued in place. This alignment method is satisfactory when fiber 8 is perfectly centered within the circular array of fibers.

If fiber 8 is not centered within the circular array, an alternate-alignment method can be used. If fiber 8 in the circular array shown in FIG. 4 is attached to surface 1.2 of lens element 1 in FIG. 1 in such a manner as to be slightly displaced from lens axis 1.1 of lens element 1, the resultant locus of points traced out on surface 1.2 as a result of rotating reflector 2 is still a circle. The circle has the same radius as it would have had if fiber 8 had been affixed to surface 1.2 at the point where lens axis 1.1 intersects surface 1.2. However, the center of the circle is displaced from lens axis 1.1 by the same distance that fiber 8 is displaced from lens axis 1.1, but in the opposite direction. Thus, in order to properly align the array of fibers when fiber 8 is not centered in the array, the entire array is positioned so that lens axis 1.1 is midway between fiber 8 and the center of the circular array of fibers. It is also appropriate at this time to orient the array of fibers so that the angular alignment coincides with the detents in the switch mechanism, e.g. the Oak switch mechanism.

What is claimed is:

1. Apparatus for selectively coupling light which comprises:

an optical focusing lens element having first and second end surfaces and a lens axis passing through said optical focusing lens element axially from said first to said second surface;

an optical source terminated on said first surface of said optical focusing lens element substantially at said lens axis;

a plurality of optical receptors terminated on said first surface of said optical focusing lens element, all at substantially the same radial displacement from said lens axis and at a plurality of angular displacements about said lens axis;

a reflecting surface disposed at said second surface of said optical focusing lens element;

characterized in that said reflecting surface is a plane reflecting surface disposed at said second surface of said optical focusing lens element in such a manner that an angle is formed between a normal to said reflecting surface and said lens axis, said plane reflecting surface being rotatable about said lens axis so that said angle is maintained at a fixed value, whereby light emanating from said optical source is selectively coupled to any of said plurality of optical receptors terminated at said plurality of angular displacements about said lens axis by rotating said plane reflecting surface.

2. Apparatus for selectively coupling light as defined in claim 1 wherein said optical focusing lens element is a graded refractive index rod.

3. Apparatus for selectively coupling light as defined in claim 1 wherein said optical source is an optical fiber.

4. Apparatus for selectively coupling light as defined in claim 1 in which at least one of said optical receptors is an optical fiber.

5. Apparatus for selectively coupling light as defined in claim 2 wherein said optical source is an optical fiber.

6. Apparatus for selectively coupling light as defined in claim 2 in which at least one of said optical receptors is an optical fiber.

7. Apparatus for selectively coupling light as defined in claim 1 wherein said reflecting surface is affixed to a wedge.

8. Apparatus for selectively coupling light as defined in claim 5 in which at least one of said optical receptors is an optical fiber.

9. Apparatus for selectively coupling light which comprises:

an optical focusing lens element having first and second end surfaces and a lens axis passing through said optical focusing lens element axially from said first to said second surface;

an optical receptor terminated on said first surface of said optical focusing lens element substantially at said lens axis;

a plurality of optical sources terminated on said first surface of said optical focusing lens element, all at substantially the same radial displacement from said lens axis and at a plurality of angular displacements about said lens axis;

a reflecting surface disposed at said second surface of said optical focusing lens element;

characterized in that said reflecting surface is a plane reflecting surface disposed at said second surface of said optical focusing lens element in such a manner that an angle is formed between a normal to said reflecting surface and said lens axis, said plane reflecting surface being rotatable about said lens axis so that said angle is maintained at a fixed value, whereby light emanating from any of said plurality of optical sources terminated at a said plurality of angular displacements about said lens axis is selectively coupled to said optical receptor by rotating said plane reflecting surface.

10. Apparatus for selectively coupling light as defined in claim 9 wherein said optical focusing lens element is a graded refractive index rod.

11. Apparatus for selectively coupling light as defined in claim 9 wherein said optical receptor is an optical fiber.

12. Apparatus for selectively coupling light as defined in claim 9 in which at least one of said optical sources is an optical fiber.

13. Apparatus for selectively coupling light as defined in claim 10 wherein said optical receptor is an optical fiber.

14. Apparatus for selectively coupling light as defined in claim 10 in which at least one of said optical sources is an optical fiber.

15. Apparatus for selectively coupling light as defined in claim 9 wherein said reflecting surface is affixed to a wedge.

16. Apparatus for selectively coupling light as defined in claim 13 in which at least one of said optical sources is an optical fiber.

* * * * *

Notice of Adverse Decision in Interference

In Interference No. 100,924, involving Patent No. 4,208,094, W. J. Tomlinson, III and R. E. Wagner, OPITCAL SWITCH, final judgment adverse to the patentees was rendered Nov. 17, 1983, as to claims 1-16.
[*Official Gazette February 7, 1984.*]